US009288136B2

(12) United States Patent
Shepherd et al.

(10) Patent No.: US 9,288,136 B2
(45) Date of Patent: Mar. 15, 2016

(54) METHOD AND APPARATUS FOR IN-BAND CHANNEL CHANGE FOR MULTICAST DATA (71) Applicant: CISCO TECHNOLOGY, INC., San Jose, CA (US)

(72) Inventors: Gregory Shepherd, Eugene, OR (US); Ali C. Begen, London (CA)

(73) Assignee: Cisco Technology, Inc., San Jose, CA (US)

(*) Notice: Subject to any disclaimer, the term of this patent is extended or adjusted under 35 U.S.C. 154(b) by 288 days.

(21) Appl. No.: 13/624,850

(22) Filed: Sep. 21, 2012

(65) Prior Publication Data
US 2014/0086243 A1 Mar. 27, 2014

(51) Int. Cl.
H04L 12/28 (2006.01)
H04L 12/761 (2013.01)
H04L 12/18 (2006.01)

(52) U.S. Cl.
CPC ............ *H04L 45/16* (2013.01); *H04L 12/1886* (2013.01)

(58) Field of Classification Search
None
See application file for complete search history.

(56) References Cited

U.S. PATENT DOCUMENTS

| 8,248,942 | B2 | 8/2012 | Wing et al. | |
| 8,301,982 | B2 | 10/2012 | Ver Steeg | |
| 2004/0022244 | A1* | 2/2004 | Boers et al. | 370/390 |
| 2007/0204312 | A1* | 8/2007 | Wheelock | 725/94 |
| 2007/0268899 | A1* | 11/2007 | Cankaya | 370/390 |
| 2008/0062990 | A1* | 3/2008 | Oran | H04L 1/1607 370/392 |
| 2008/0225698 | A1* | 9/2008 | Smith et al. | 370/218 |
| 2008/0253369 | A1* | 10/2008 | Oran | H04L 1/0001 370/390 |
| 2010/0043022 | A1* | 2/2010 | Kaftan | 725/34 |
| 2010/0154013 | A1* | 6/2010 | Mas Ivars | H04N 7/17318 725/109 |
| 2010/0185730 | A1* | 7/2010 | Sebastian | 709/204 |
| 2010/0188989 | A1 | 7/2010 | Wing et al. | |
| 2010/0254462 | A1* | 10/2010 | Friedrich | H04N 21/26616 375/240.25 |
| 2011/0019673 | A1* | 1/2011 | Fernandez Gutierrez | 370/390 |
| 2011/0096849 | A1* | 4/2011 | Kubsch et al. | 375/259 |
| 2011/0225607 | A1* | 9/2011 | Smith et al. | 725/32 |
| 2012/0030707 | A1* | 2/2012 | Cedervall et al. | 725/38 |
| 2012/0320757 | A1* | 12/2012 | Lohmar | H04L 65/605 370/241 |
| 2013/0332974 | A1* | 12/2013 | Lundqvist et al. | 725/109 |

OTHER PUBLICATIONS

IETF RFC 6128, "RTP Control Protocol (RTCP) Port for Source-Specific", A. Begen et al., Feb. 2011.
IETF Draft 5760, "RTP Control Protocol (RTCP) Port for Multicast Sessions", A. Begen, Apr. 3, 2010.
IETF RFC 3569, "An Overview of Source-Specific Multicast (SSM)", S. Bhattacharyya, Jul. 2003.

* cited by examiner

*Primary Examiner* — Dang Ton
*Assistant Examiner* — Ronald H Davis
(74) *Attorney, Agent, or Firm* — Cindy Kaplan (57) ABSTRACT In one embodiment, a method includes transmitting media from a source to a plurality of receivers in a first source-specific multicast (SSM) channel and transmitting from the source to said plurality of receivers, a channel change message in an in-band transport control protocol message identifying a second SSM channel, wherein the receivers are configured to join said second SSM channel in response to said channel change message.

18 Claims, 4 Drawing Sheets

METHOD AND APPARATUS FOR IN-BAND CHANNEL CHANGE FOR MULTICAST DATA

TECHNICAL FIELD

The present disclosure relates generally to communication networks, and more particularly, to channel change for multicast data.

BACKGROUND

Traditional Internet Protocol (IP) communication allows a host to send packets to a single host (unicast transmission) or to all hosts (broadcast transmission). To support a demand to provide applications that involve high data rate transmission to multiple hosts, multicast routing has evolved. Multicast routing is used to send data communications to multiple receivers on a network utilizing a multicast address. By sending only a single transmission stream intended for multiple receivers, multicast conserves bandwidth. Thus, multicast is often used to stream audio, video, and other data in a wide range of applications. Source-specific multicast (SSM) is a method of delivering multicast packets in which the only packets that are delivered to a receiver are those originating from a specific source requested by the receiver. By limiting the source, SSM reduces demands on the network and improves security.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises transmitting media from a source to a plurality of receivers in a first source-specific multicast (SSM) channel and transmitting from the source to the receivers, a channel change message in an in-band transport control protocol message identifying a second SSM channel, wherein the receivers are configured to join said second SSM channel in response to said channel change message.

In another embodiment, a method generally comprises receiving at a receiver, media from an SSM source in a first SSM channel and a channel change message in an in-band transport control protocol message identifying a second SSM channel, and joining the second SSM channel in response to said channel change message.

In yet another embodiment, an apparatus generally comprises a processor for transmitting media from a source to a plurality of receivers in a first SSM channel and transmitting from the source to the receivers, a channel change message in an in-band transport control protocol message identifying a second SSM channel, and memory for at least temporarily storing information for the second SSM channel. The channel change message requests the receivers to join the second SSM channel.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A network implementing the embodiments described herein is configured to use IP (Internet Protocol) multicast, which simultaneously delivers a single stream of information to numerous recipients. A brief discussion of multicast routing is provided to help introduce concepts used in the embodiments.

Multicast operation is based on the concept of a group. A multicast group is an arbitrary group of receivers that expresses an interest in receiving a particular data stream. An IP multicast address, or a portion thereof, specifies a particular group. A receiver (host, listener, group member) expresses interest in receiving packets sent to a specific multicast address. Hosts that are interested in receiving data flowing to a particular group, join the group using Internet Group Management Protocol (IGMP) or Multicast Listener Discovery (MLD), for example. A multicast source (e.g., server) sends packets with the destination IP address set to a particular multicast group address.

Multicast-capable routers create distribution trees that control the path that IP multicast traffic takes through the network in order to deliver traffic to all receivers. Members of multicast groups can join or leave at any time; therefore the distribution trees are dynamically updated.

Data flow through the distribution tree may be referred to as downstream or upstream. The term 'downstream' generally refers to the data flow of packets being forwarded by network nodes toward the receivers, and 'upstream' generally refers to the data flow of packets being forwarded by the network nodes toward the source (i.e., toward a multicast sender). A downstream interface may be referred to as an outgoing interface and an upstream interface may be referred to as an incoming interface. Each router within the distribution tree creates, stores, and maintains the incoming and outgoing interfaces for each multicast group, which is generally referred to as the multicast forwarding state and stored as multicast forwarding entries.

Multicast forwarding state is typically referenced in terms of '(S,G)'. In (S,G) notation, the 'S' represents the source's unicast IP address. The IP header of a multicast data packet includes S as the packet's source address. The 'G' refers to the particular multicast group address involved. The IP header of the multicast data packet contains G as the packet's destination address.

Source-specific multicast (SSM) is a method of transmitting multicast packets in which the only packets delivered to a receiver are those originating from a specific source address requested by that receiver. In addition to the receiver expressing interest in traffic sent to a multicast address, the receiver expresses interest in receiving traffic from only one specific source sending to that multicast address. This relieves the network from having to discover many multicast sources and reduces the amount of multicast routing information that the network maintains.

With SSM, receivers subscribe to an (S,G) channel, which has one source and any number of receivers. There are many applications in which an entire group of receivers of a given SSM distribution tree may be requested to change to a different channel or add another channel for redundancy, backup, or repair. Use of a pre-configured file, such as an SDP (Session Description Protocol) file requires all receivers to use an out-of-band mechanism to obtain any new channel information.

The embodiments described herein utilize an in-band channel change message to instruct a group of receivers to join a new SSM distribution channel. The channel change message may be used, for example, to instruct a group of receivers to simultaneously join a new channel for redundancy or repair, or to move the receivers to the new channel and then leave the old channel. In one embodiment, the in-band channel change message is transmitted in an in-band transport control protocol message (e.g., RTCP (RTP Control Protocol). This allows an existing data (media) session (e.g., RTP (Real-time Transport Protocol) session) to be used to send the control message to all receivers without requiring any out-of-band application, and allows for dynamic population changes without predefined SDP entries.

Figure 1:
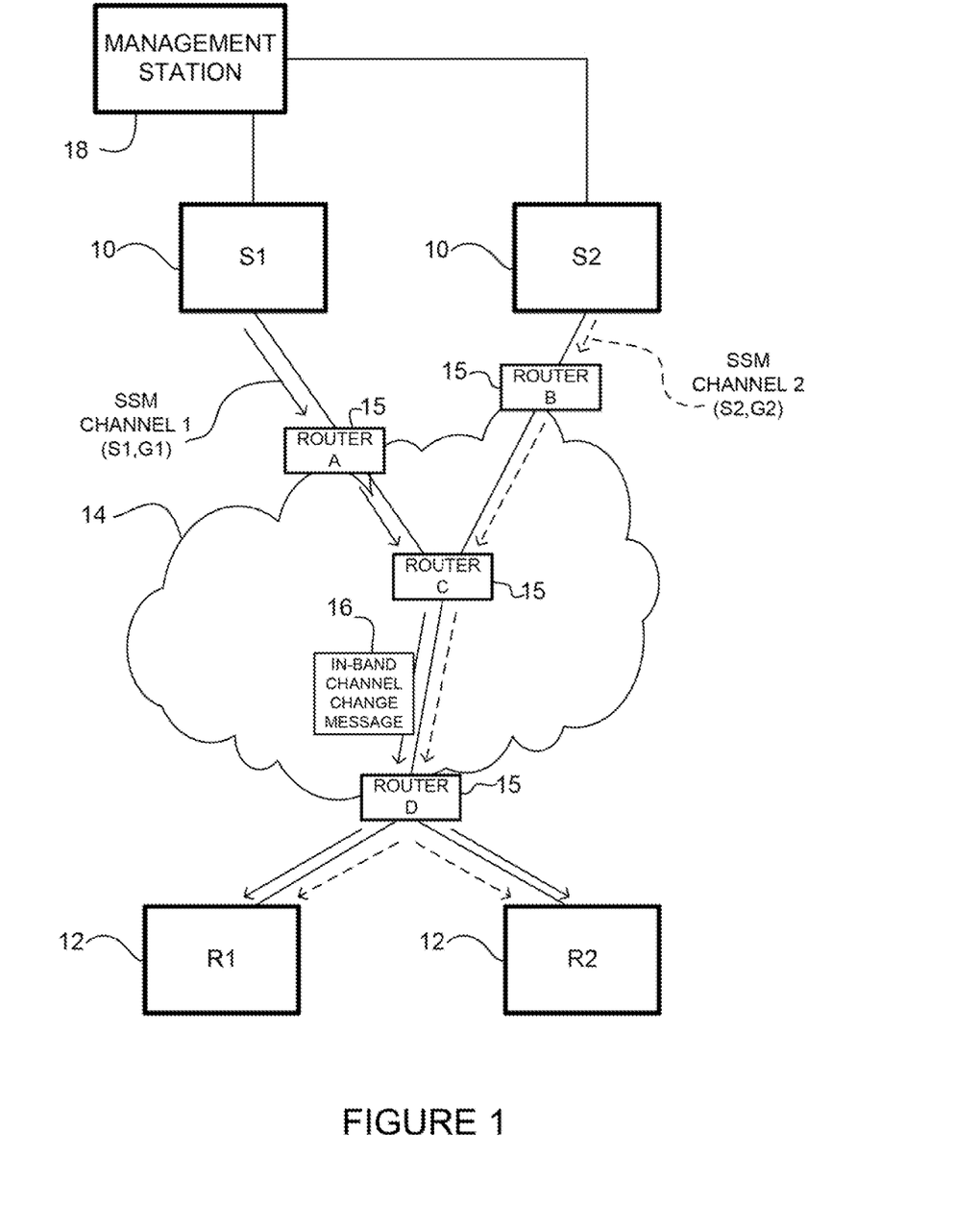
FIG. 1 illustrates an example of a network in which embodiments described herein may be implemented.

Referring now to the drawings, and first to FIG. 1, an example of a network in which embodiments described herein may be implemented is shown. A communication system includes a plurality of sources (servers, hosts) (S1, S2) 10 in communication with a plurality of receivers (clients, client devices, end users) 12 over network 14. For simplification, only a small number of nodes are shown. The sources 10 are configured to deliver requested media to receivers 12. The media (content, data) may include any suitable information that can propagate in the network 14. For example, media may include video, images, graphics, text, Web pages, audio, or other data or combination thereof. The content transmitted from the source 10 may be encrypted, compressed, or encoded according to any format.

FIG. 1 illustrates an example of SSM traffic delivery, in accordance with one embodiment. In addition to the receiver 12 expressing interest in traffic sent to a multicast address, the receiver expresses interest in receiving traffic from one specific source sending to that multicast address. In SSM, delivery of packets is based on (S,G) channels (e.g., (S1,G1), (S2,G2) in FIG. 1). Traffic for one (S,G) channel comprises packets with an IP unicast source address S and the multicast group address G as the destination address. Receivers 12 receive traffic by becoming members of the (S,G) channel. With SSM, the receivers 12 subscribe to (S,G) channels to receive traffic from a specific source. Thus, the receivers 12 receive traffic only from (S,G) channels to which they are subscribed. As described further below, the receivers R1, R2 in FIG. 1 may subscribe to SSM channel 1 (S1,G1) or SSM channel 2 (S2,G2), change between channels or add a new channel so that the receivers are subscribed to both channels.

The source 10 may be, for example, a server that stores media locally or receives media from another server or source (not shown) via another network, satellite, cable, or any other communication device. The receiver 12 may be, for example, a personal computer, set-top box, personal digital assistant (PDA), VoIP phone, tablet, Internet connected television, cellular telephone, telepresence device, media center device, or any other network device.

The source 10 sends traffic in a media stream to any combination of receivers 12 via the network 14. The network 14 may include one or more networks (e.g., local area network, metropolitan area network, wide area network, enterprise network, Internet, intranet, radio access network, public switched network, or any other network or combination of networks). The flow path between the source 10 and receivers 12 may include any number or type of intermediate nodes (e.g., routers, switches, gateways, or other network devices), which facilitate passage of data between the endpoints. For example, the network path between the source 10 and receivers 12 may include any number of core and edge routers 15. In the example shown in FIG. 1, the network 14 includes edge routers A, B, and D, and core router C. The core router 15 may maintain one or more outgoing interface lists for the multicast forwarding states. As described further below, the multicast forwarding states may be aggregated using Source Rooted Multicast (SRM) to reduce the number of stored forwarding state entries at the core router in deployments where many hosts are running the same application and using the same multicast group.

The sources 10 may be in communication with one or more management stations 18. The management station 18 is configured to receive network information or input from a network administrator and transmit instructions to the sources 10 regarding one or more distribution channels. For example, the management station 18 may request that receivers 12 of a given SSM distribution tree add another (S,G) for redundancy, backup, or repair, or may request that receivers change to a different SSM distribution tree for optimization, as described in detail below. The source 10 may also receive information used to implement a channel change from another source or network device.

The source 10 utilizes a transport protocol to stream audio, video, text, and other real-time data in a wide range of applications including, for example, entertainment, conferencing, VoIP (Voice over IP), and other media applications. In one embodiment, the transport protocol is Real-time Transport Protocol (RTP). The RTP source sends one or more streams or flows of RTP packets. Information provided by RTP includes timestamps (for synchronization), sequence numbers (for packet loss and reordering detection) and payload format, which indicates the encoded format of the data. The sequence number is incremented by one for each RTP data packet sent and is used by the receiver to detect packet loss and to restore packet sequence. An RTP session may be established for each media stream. The RTP source may be managed by a service provider that distributes audio, video, or any other type of real-time content to one or multiple customer sites. A transport control protocol is used to provide control information for the media flow. In one embodiment, RTCP is used to provide feedback on quality of service (QoS) in media distribution by periodically sending statistics information to participants in a streaming media session. RTCP reports are typically sent by all participants.

In the example shown in FIG. 1, the sources 10 are both SSM and RTP sources. The RTP source and multicast source may also be separate nodes. For example, one or more media senders may transmit RTP packets to a distribution source, which then multicasts the RTP packets to multicast receivers using an SSM arrangement. In this case, the distribution source also multicasts the forwarded RTCP traffic (e.g., RTCP sender reports) to the receivers in the same SSM session.

There may be any number of sources 10 providing content to any number of receivers 12. As shown in FIG. 1, for example, source S1 may send packets in a media stream to receivers R1 and R2. In this example, receivers R1 and R2 have previously requested source S1 in subscribing to group G1 so that receivers R1 and R2 receive multicast traffic intended for group G1 from source S1. Multicast traffic is transmitted to R1 and R2 in a first SSM distribution channel (SSM channel 1).

The group of receivers of the SSM distribution tree may be requested to change to a different SSM channel or add another SSM channel. For example, in a live-live multicast scenario, the downstream nodes may be asked to tune to a different channel because the source will be changed for scheduled maintenance. The term 'channel change' as used herein may refer to a change from one SSM channel to another SSM channel or the addition of a new SSM channel.

In order to initiate a channel change, a channel change message 16 is transmitted from the source S1 to receivers R1, R2 to instruct the receivers to add a new SSM distribution channel (e.g., SSM channel 2 in FIG. 1). The channel change message 16 may also be used to instruct the receivers R1. R2 to leave the old distribution channel (SSM channel 1) after joining the new channel. As described in detail below, the channel change message 16 is used to signal new multicast information that the receivers use to join the new distribution channel. The multicast information may include, for example, a new channel (e.g., (S2,G2) in FIG. 1). If the receivers R1, R2 are to leave the old distribution channel, the channel change message 16 may also include the last sequence number to accept on the old channel (e.g., (S1,G1) in FIG. 1). The group for the new distribution channel may be the same or different than the group used for the old distribution channel (e.g., G1 may be the same group as G2, or G1 and G2 may be different groups).

The embodiments described herein use an in-band channel change message 16 to signal the channel change to the receivers 12. In one embodiment, RTCP is used to transmit the channel change message 16. Since the entire receiver population is already 'tuned' to a given distribution channel, RTCP can be used to signal any new (S,G) information to all receivers simultaneously. The term 'in-band' as used herein refers to the use of a protocol messaging scheme that is already in use for the media session between the source and the receivers. Thus, there is no need to use an out-of-band mechanism to transmit a file or message with channel information.

It is to be understood that the network shown in FIG. 1 and described herein is only an example and that the embodiments may be implemented in networks having different network topologies or network devices, without departing from the scope of the embodiments. For example, there may be any number of receivers receiving data in a SSM distribution channel and any number of SSM channels. Also, there may be any number of routers (core and edge routers) in the network path between the source and receivers. For example, router C in FIG. 1 may transmit data to two or more downstream edge routers, each in communication with one or more receivers. Edge routers A and B may also be in communication with two or more sources. In one example, the number of sources may be increased in an effort to support a massively deployed application, while the number of groups are not increased. Source rooted multicast may be used in this case to aggregate multicast forwarding state at the core router, as described below.

Figure 2:
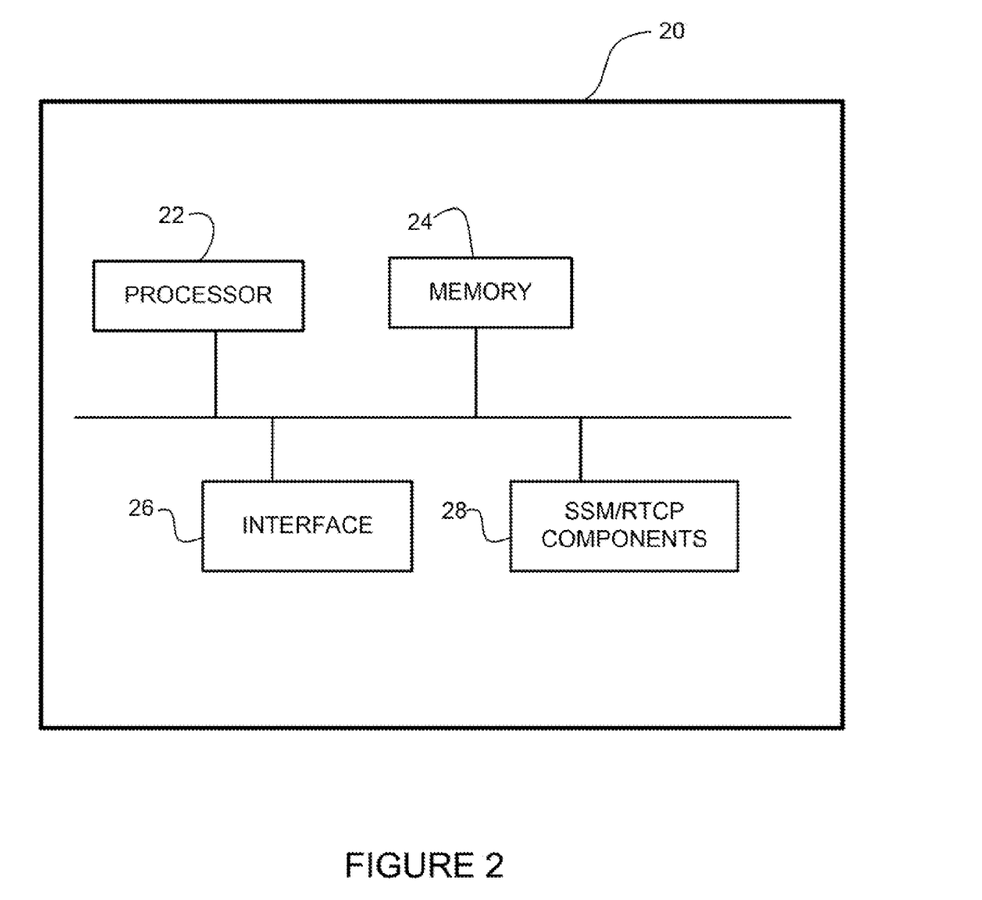
FIG. 2 depicts an example of a network device useful in implementing embodiments described herein.

FIG. 2 illustrates an example of a network device 20 (e.g., source, receiver) that may be used to implement embodiments described herein. In one embodiment, the network device 20 is a programmable machine that may be implemented in hardware, software, or any combination thereof. The network device 20 includes one or more processor 22, memory 24, and network interface 26.

Memory 24 may be a volatile memory or non-volatile storage, which stores various applications, operating systems, modules, and data for execution and use by the processor 22. Memory 24 may comprise separate memory elements (e.g., media memory, system memory, etc.). Memory 24 may store, at least temporarily, information about the new channel to which the receivers are to join. This information may be used to generate the channel change message 16.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise any number of interfaces (linecards, ports) for receiving data or transmitting data to other devices. The interface 26 may include, for example, an Ethernet interface for connection to a computer or network.

The network device 20 further comprises one or more components 28 (e.g., modules, logic, computer code, and the like) configured to generate or process join and prune messages for use in SSM operation, and compatible with a transport control protocol (e.g., RTCP) used to process or transmit the in-band channel change message 16. These components 28 may include, for example, computer code stored in memory 24.

It is to be understood that the network device 20 shown in FIG. 2 and described above is only an example and that different configurations of network devices may be used. For example, the network device 20 may include any suitable combination of hardware, software, algorithms, processors, devices, components, or elements operable to facilitate the capabilities described herein.

Figure 3:
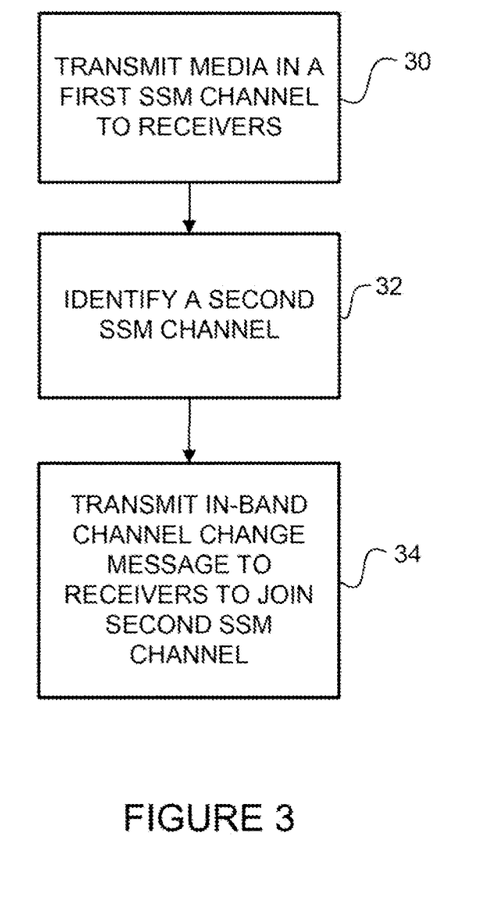
FIG. 3 is a flowchart illustrating a process for implementing in-band channel change at a source, in accordance with one embodiment.
Figure 4:
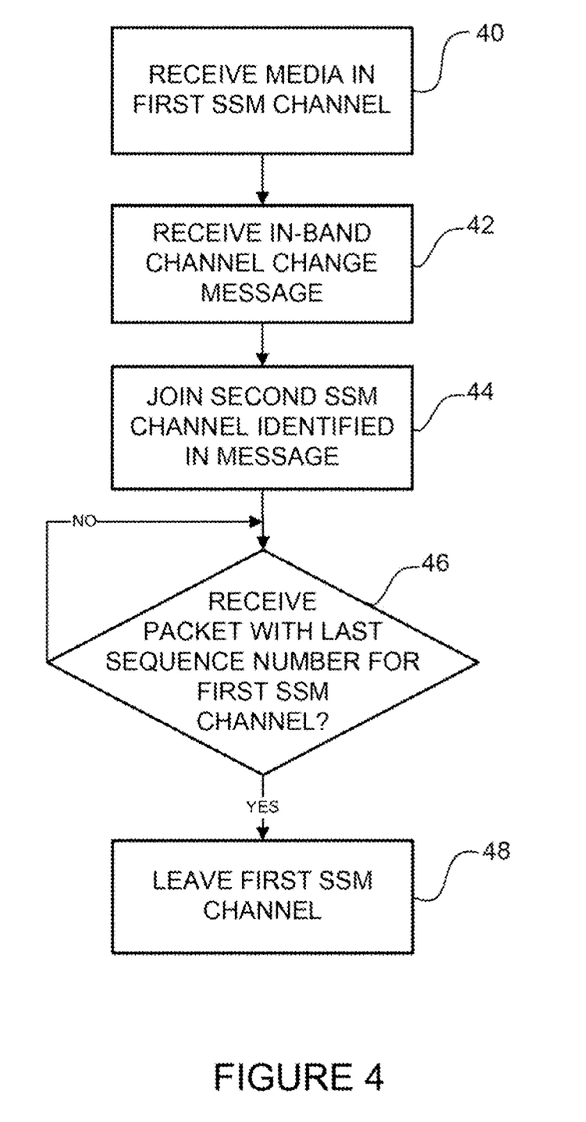
FIG. 4 is a flowchart illustrating a process for in-band channel change at a receiver, in accordance with one embodiment.

FIGS. 3 and 4 are flowcharts illustrating an overview of a process for in-band channel change, in accordance with one embodiment. FIG. 3 illustrates operation at a source network device 10 and FIG. 4 illustrates a process at the receiver 12.

Referring first to FIG. 3, a process for implementing an in-band channel change at source 10 is shown. In this example, receivers R1, R2 have joined multicast group G1 and requested data from source S1 in the first SSM distribution channel (channel 1 (S1,G1)) (FIG. 1). Source S1 is a multicast source for the first SSM distribution channel and may also be the transport protocol (e.g., RTP) source or there may be a different media source (e.g., RTP source) from which S1 receives RTP packets. At step 30, source S1 transmits media in a transport protocol (e.g., RTP) session on SSM channel 1 to receivers R1, R2. Source S1 identifies a second SSM distribution channel (step 32). This may be indicated at S1, for example, by a message received from the management station 18 or an RTP source, or other information received at the multicast source. Source S transmits channel change message 16 in-band to receivers R1, R2, requesting the receivers to join a second SSM distribution channel (channel 2 (S2, G2)) (step 34). The channel change message 16 may be generated at the SSM source S1 or received at the source from a media sender (e.g., RTP source) and multicast to the receivers R1, R2. The channel change message 16 is transmitted in an in-band transport control protocol message and identifies the second SSM channel. Details of one example of an in-band channel transport control protocol message 16 are described further below.

As previously discussed, the channel change message 16 may be used to instruct the receivers 12 to add a new channel (e.g., join (S2,G2)) or change from one channel to another channel (e.g., join (S2,G2) and then leave (S1,G1)) (FIG. 1). The channel change message 16 includes information identifying the new SSM channel (e.g., source address (IP address for S2) and multicast address G2). In the case of a change from one channel to another channel, the message 16 also includes the last sequence number to accept on the old SSM channel (S1,G1). The channel change message 16 is preferably sent several seconds in advance of any content change, and sent more than once to ensure it arrives at every receiver 12.

Referring now to FIG. 4, an overview of a process for in-band channel change at the receiver 12 is shown, in accordance with one embodiment. At step 40, the receiver 12 receives media in a media session (e.g., RTP session) from SSM source 10 (S1 in FIG. 1). The receiver 12 receives in-band channel change message 16 requesting the receiver to add a new SSM channel (step 42). As previously described, the channel change message identifies the new SSM channel ((S2,G2) in FIG. 1). In response to receiving the message 16, the receiver 12 joins the new SSM channel (S2,G2) identified in the channel change message (step 44). The channel change message 16 may also include the last sequence number to accept on the first SSM channel (S1,G1), if the receiver 12 is to leave the first channel after joining the second channel. The receiver 12 will join the second channel (S2,G2 as instructed but will not leave the first channel (S1,G1) until all of the packets with a sequence number up to and including the sequence number specified in the channel change message 16 is received on the first channel. Upon receiving the last sequence number, the receiver 12 leaves the first channel (steps 46 and 48). At this time all new media packets will be received on the new (S2,G2) distribution tree.

It is to be understood that the processes shown in FIGS. 3 and 4 are only examples and that steps may be added, removed, reordered, combined, or modified, without departing from the scope of the embodiments.

As discussed above, the in-band channel change message 16 is transmitted in a transport control protocol message for an existing media session. In one embodiment, the in-band channel change message is an RTCP message. The RTCP message may be, for example, a sender report that is sent periodically by the sender to report transmission and reception statistics for RTP packets. The new channel information (S,G) may be encoded as a type-length-value (TLV) element inside of the protocol. For example, the RTCP message may contain one or more TLV-encoded fields to describe the new SSM distribution channel (e.g., source address S2, multicast address (S2,G2)). Another field may be used to transmit the relevant sequence number (or numbers) in the SSM distribution channels.

The following are implementation examples for the in-band channel change message described above.

In one example, it may be desired to add a backup distribution channel for a group of receivers currently receiving data on an SSM distribution channel. The second channel may be provided for redundancy, for example. This scenario may be referred to as live-live or make-before-break, since both channels are active at the same time. In the case of a failure in the primary channel, the backup channel is immediately available so that receivers can receive data from the backup channel. If the receivers 12 had not previously joined the backup channel, there would be a loss of content while the receivers switch to another source.

In another example, there may be a planned outage at a source for repair or maintenance. The downstream nodes can be asked to tune to a different channel since the source will soon change. This prevents loss of content during the change to the new source.

In one example, the in-band channel change message 16 is transmitted to provide optimization with Source Rooted Multicast (SRM), as described in U.S. patent application Ser. No. 13/533,863, filed Jun. 26, 2012, which is incorporated herein by reference in its entirety. SRM associates outgoing interface lists in a forwarding entry of a network device (e.g., core router C in FIG. 1) with the source address instead of the group address so that multicast forwarding states can be aggregated. This allows the amount of forwarding states to be reduced, especially in deployments where many hosts are all running the same application and using the same multicast group.

The receivers 12 may, for example, execute the same application, using the same multicast group, with the multicast group using source-based trees in which a separate multicast distribution tree is built for each multicast source sending data to a multicast group. In this scenario and for this particular multicast group, group state is no longer relevant. Any set of receivers' interest is relevant only to the source of the multicast content. The outgoing interface list in the multicast forwarding entry may be bound to the source address rather than the group address. Once the outgoing interface list is bound to the source address, the multicast forwarding state may be aggregated. In some cases, the multicast forwarding state may be aggregated based on matching outgoing and incoming interface information in the multicast forwarding entry.

In some cases, aggregated forwarding state may be further aggregated based on matching source address prefixes on power-of-2 boundaries, creating 'S/n' multicast forwarding entries. The 'n' indicates the number of significant bits in the source address 'S' that match. The boundary in the source address generally refers to the bit position in the source address that marks the dividing point between bit values that are always the same (the prefix) and bit values that will vary. For example, if a source address is an IP address with 32 bits, S/28 indicates that the first 28 bits of the source addresses in the aggregated forwarding state are all the same, but the last 4 bits may be different. If the source addresses in an aggregated forwarding state are sequential and fill a power-of-2 boundary, the aggregated forwarding state may be represented by the S/n prefix, thereby reducing the number of bits used to store the forwarding state. In this manner, the amount of forwarding state may be reduced, for example, in a massively deployed application with many sources.

The embodiments described herein may be used to move one or more receivers from one distribution channel to another distribution channel for dynamic multicast state optimization and traffic engineering in SRM. Content sourcing is moved to provide state optimization for SRM. Continuous source prefixes on power-of-2 boundaries (described above) can be engineered and maintained to minimize forwarding state at one or more multicast routers 15. The optimization may be identified, for example, at one or more nodes in the network and provided to the management station 18, which transmits the information for the channel change message to the source 10.

Optimization may also be performed to reduce bandwidth usage or network delay and may be identified at one or more network devices (e.g., routers 15, source 10, management station 18) and based on the optimization, a channel change message 16 is generated and transmitted to a group of receivers on a distribution channel to move the receivers to a different SSM channel.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    transmitting media in an RTP (Real-time Transport Protocol) session from a source to a plurality of receivers in a first source-specific multicast (SSM) channel;
    identifying at the source, a second SSM channel for said plurality of receivers to join; and
    transmitting from the source to said plurality of receivers, a channel change message in an in-band transport control protocol message identifying said second SSM channel for said plurality of receivers to join, wherein said channel change message comprises an RTCP (RTP (Real-time Transport Protocol) Control Protocol) message associated with said RTP session;
    wherein said plurality of receivers are configured to join said second SSM channel in response to said channel change message; and
    wherein said channel change message comprises a source address and a multicast group address for use by said plurality of receivers in joining said second SSM channel, and if said plurality of receivers are to leave said first SSM channel, sequence data for said media transmitted on said first SSM channel, said sequence data comprising a last sequence number said plurality of receivers should accept on said first SSM channel so that said plurality of receivers do not leave said first SSM channel until all packets with a sequence number up to and including said last sequence number are received on said first SSM channel.

2. The method of claim 1 wherein said plurality of receivers are configured to change from said first SSM channel to said second SSM channel.

3. The method of claim 1 wherein said second SSM channel operates as a backup distribution channel.

4. The method of claim 1 wherein the source operates as an SSM source node for said first SSM channel and operates as a source for said RTP media session.

5. The method of claim 1 wherein said channel change message comprises multicast information used by said plurality of receivers to join said second SSM channel, said multicast information comprising a source and group from said second SSM channel and instructions as to whether said plurality of receivers are to leave said first SSM channel.

6. The method of claim 1 further comprising performing dynamic multicast state optimization at the source and determining that one or more of said plurality of receivers should be moved from said first SSM channel to the said second SSM channel.

7. The method of claim 1 further comprising receiving instructions from a management station to transmit said channel change message based on optimization performed at a network node.

8. A method comprising:
    receiving at a receiver, media in an RTP (Real-time Transport Protocol) session from a source-specific multicast (SSM) source in a first SSM channel;
    receiving at the receiver, a channel change message in an in-band transport control protocol message identifying a second SSM channel in response to the SSM source identifying said second SSM channel for the receiver to join, wherein said channel change message comprises an RTCP (RTP (Real-time Transport Protocol) Control Protocol) message associated with said RTP session; and
    joining said second SSM channel in response to said channel change message;
    wherein said receiver continues to receive said media on both said first and second SSM channels after joining said second SSM channel to provide redundancy for the duration of the RTP session.

9. The method of claim 8 wherein said channel change message comprises a source address and multicast address for said second SSM channel.

10. The method of claim 8 wherein said channel change message comprises sequence data for said media transmitted on said first SSM channel and further comprising changing from said first SSM channel to said second SSM channel at the receiver.

11. The method of claim 10 wherein said sequence data comprises a last sequence number the receiver should accept on said first SSM channel and further comprising leaving said first SSM channel upon receiving a packet with said last sequence number.

12. The method of claim 8 wherein said receiver receives said media on both said first and second SSM channels after joining said second SSM channel.

13. An apparatus comprising:
    a processor for transmitting media in an RTP (Real-time Transport Protocol) session from a source to a plurality of receivers in a first source-specific multicast (SSM) channel, identifying at the source, a second SSM channel for said plurality of receivers to join, and transmitting from the source to said plurality of receivers, a channel change message in an in-band transport control protocol message identifying said second SSM channel for said plurality of receivers to join; and
    memory for at least temporarily storing information for said second SSM channel;
    wherein said channel change message comprises an RTCP (RTP (Real-time Transport Protocol) Control Protocol) message associated with said RTP session and requests said plurality of receivers to join said second SSM channel;
    wherein said channel change message comprises a source address and a multicast group address for use by said plurality of receives to join said session SSM channel, and if said plurality of receivers are to leave said first SSM channel, sequence data for said media transmitted on said first SSM channel, said sequence data comprising a last sequence number said plurality of receivers should accept on said first SSM channel so that said plurality of receivers do not leave said first SSM channel until all packets with a sequence number up to and including said last sequence number are received on said first SSM channel.

14. The apparatus of claim 13 wherein said plurality of receivers are configured to change from said first SSM channel to said second SSM channel.

15. The apparatus of claim 13 wherein a group address for said second SSM channel is the same group address as for said first SSM channel.

16. The apparatus of claim 13 wherein said RTCP message comprises (S, G) information comprising a source address and a group address for said second SSM channel, wherein said (S, G) information is used by said plurality of receivers to join said second SSM channel.

17. The apparatus of claim 13 wherein said in-band transport control protocol message comprises a protocol messaging scheme that is already in use for a media session used to transmit said media between the source and said plurality of receivers.

18. The apparatus of claim 13 further comprising moving content sourcing to provide state optimization for Source Rooted Multicast (SRM).

* * * * *